United States Patent [19]

Santoso et al.

[11] Patent Number: 5,832,421

[45] Date of Patent: *Nov. 3, 1998

[54] METHOD FOR BLADE TEMPERATURE ESTIMATION IN A STEAM TURBINE

[75] Inventors: Nugroho Iwan Santoso, Cranbury; Thomas Petsche, Neshanic Station, both of N.J.

[73] Assignee: Siemens Corporate Research, Inc., Princeton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 764,381

[22] Filed: Dec. 13, 1996

[51] Int. Cl.⁶ .................................................. G01K 15/10
[52] U.S. Cl. ............................ 702/130; 702/60; 395/904
[58] Field of Search ............................... 364/557, 551.01, 364/550, 494, 495; 395/21, 22, 23, 902–904, 906, 907, 911, 912, 914, 915, 11, 24; 706/20, 21, 25; 702/130, 182, 60

[56] References Cited

U.S. PATENT DOCUMENTS

| | | | |
|---|---|---|---|
| 3,873,817 | 3/1975 | Liang | 235/151.21 |
| 4,025,765 | 5/1977 | Giras et al. | 235/151.21 |
| 4,227,093 | 10/1980 | Uram et al. | 290/40 R |
| 4,576,007 | 3/1986 | Arakawa et al. | 60/660 |
| 4,679,399 | 7/1987 | Strickler | 60/646 |
| 4,764,025 | 8/1988 | Jensen | 374/144 |
| 4,827,429 | 5/1989 | Silvestri, Jr. | 364/494 |
| 4,891,948 | 1/1990 | Kure-Jensen et al. | 60/645 |
| 4,970,670 | 11/1990 | Twerdochlib | 364/571.03 |
| 5,267,435 | 12/1993 | Frenkel et al. | 60/204 |
| 5,305,230 | 4/1994 | Matsumoto et al. | 364/495 |
| 5,306,088 | 4/1994 | Zoerner | 374/131 |
| 5,311,562 | 5/1994 | Palusamy et al. | 375/215 |
| 5,333,240 | 7/1994 | Matsumoto et al. | 395/23 |
| 5,353,628 | 10/1994 | Bellows | 73/25.01 |
| 5,386,689 | 2/1995 | Bozich et al. | 60/39.33 |
| 5,439,160 | 8/1995 | Marcantonio | 228/102 |
| 5,479,358 | 12/1995 | Shimoda et al. | 364/492 |
| 5,640,176 | 6/1997 | Mundt et al. | 345/146 |

FOREIGN PATENT DOCUMENTS 0 389 132   9/1990   European Pat. Off. .

OTHER PUBLICATIONS

"Turbine Back Pressure Identification and Optimization With Learning Neural Networks", Mathur et al., Advances in Instrumentation And Control, vol. 45, 1 Jan. 1990, pp. 229–236.

Patent Abstracts of Japan, vol. 004, No. 072 (M–013), 27 May 1980 & JP 55 035112 (Toshiba Corp.) 12 Mar. 1980.

"Comparing Display Integration Strategies for Control of a Simple . . . ", Edlund et al., Oct. 2,1994, Proceedings of the Int'l Conf. on Systems, Man, and Cybernetics, San Antonio, Oct. 2–5, 1994, vol. 3 of 3, pp. 2686–2691.

"The Data Acquisition Systems Handbook", vol. 29, Omega, pp. B–2–B–18. No date.

*Primary Examiner*—James P. Trammell
*Attorney, Agent, or Firm*—Adel A. Ahmed

[57] ABSTRACT

A method for blade temp estimation in a steam turbine utilizes measurement values including pressure and temperature at locations other than directly at the blades, principally at the input and output stages. Initially, blade temperature is simulated by using a water/steam cycle analysis program as well as by directed experiments. An artificial neural network (ANN) is trained by presenting the measurement values and the blade temp values. In a hybrid approach, 5 measured values are utilized. A subset of 4 parameter values is used for training the ANN and another subset of 3 values is used for performing a calculation for another intermediate parameter. Using the intermediate parameter and one of the 5 measured values, a blade temperature is calculated.

5 Claims, 14 Drawing Sheets

METHOD FOR BLADE TEMPERATURE ESTIMATION IN A STEAM TURBINE

In the operation of steam turbines, as for turbogenerators, it is important that operating parameters be kept within defined limits for proper and safe operation, including start-up and shut-down phases. Unsafe operation can have grave consequences for personal injury and material damage.

Reference is hereby made to an application by the present inventors being filed concurrently herewith and entitled A GRAPHICAL USER INTERFACE SYSTEM FOR STEAM TURBINE OPERATING CONDITIONS now accorded Ser. No. 08/768,047 now pending whereof the disclosure is incorporated herein to the extent it does not conflict with the present application.

Typically, in steam turbo-generator operations, the turbine was operated around full power or, when the demand for power was insufficient, it was shut down. Particularly in operation as part of a large power grid, operation at less than full load may be required. Under such conditions, complex patterns of temperature, pressure, steam wetness, reheating, expansion and compression, may occur, possibly resulting in excessive turbine blade temperature. Such conditions may spell blade failure with possibly disastrous consequences. Thus, monitoring operation under conditions where the intake steam pressure is at or lower than the output pressure are of practical importance. Background material is available in books such as W. W. Bathie, "Fundamentals of gas turbines", John Wiley and Sons, 1996; and H. Herlock, "Axial flow turbines: Fluid mechanics and thermodynamics", Butterworth, London, 1960.

Good mathematical models for simulating the steam behavior in a turbine in its entire operating domain are not readily available, especially concerning periods in which the main-steam pressure is near or lower than the exhaust pressure. During such periods, the fluid flow behavior is very complex because the radial component of velocity become significant as compared with the axial velocity component. The available simplified mathematical models for simulating the steam behavior during normal loading typically do not perform properly when the intake pressure is near or lower than the output pressure.

In new large steam turbines, temperature measuring devices are installed at the respective stages of the HP and LP casings. These measurements provides an indication to the operator or supervising engineer in charge whenever the blade temperature exceeds its limit. The need for blade temperature monitoring for smaller and older turbine, as well as a more practical and cost effective ways than installing temperature probes, has led to a need, herein recognized, for a practical system for estimating in real time and monitoring turbine blade temperature during operation.

The present invention is intended to be practiced preferrably with the application of a programmable computer.

In accordance with an aspect of the invention, a method for blade temperature estimation in a steam turbine utilizes measurement values including pressure and temperature at locations other than directly at the blades, principally at the input and output stages. Initially, blade temperature is simulated by using a water/steam cycle analysis program as well as by directed experiments. An artificial neural network (ANN) is trained by presenting the measurement values and the blade temp values. In a present exemplary embodiment, it is found that 4 values provide a satisfactory result. In one method the ANN is used directly to derive operating blade temp values.

In a accordance with another aspect of the invention, a hybrid approach, 5 measured values are utilized. A subset of, for example, 4 parameter values is used for training the ANN and another subset of, for example, 3 values is used for performing a calculation for another intermediate parameter. Using the intermediate parameter and one of the 5 measured values, a blade temperature is calculated.

In accordance with still another aspect of the invention, the user interface provides a real-time information display for a supervising engineer in charge of turbine operation so that critical parameter values and undesirable combinations of operating conditions are readily observed and deviations are made apparent so that corrective action can be initiated rapidly. While graph plots of parameters can be readily presented, such a format generally does not readily provide an overall picture of the state of the turbine with regard to the distribution and combination of temperature, pressure, steam wetness or superheat, and turbulence effects.

In accordance with the present invention, an overview of the operating situation is made more readily apparent by representing the operating expansion and compression processes by lines on a Mollier enthalpy/entropy chart. In combination, real-time parameter values and parameter trends are also presented. Using the Mollier chart information in conjunction with trend and real-time information, the supervising engineer can more quickly identify and correct undesirable and potentially troublesome operation conditions.

In accordance with an aspect of the present invention, a system utilizes a hybrid ANN (artificial neural network) algorithmic based scheme for estimating the blade temperature from other measurements which are commonly available. The commonly available measurement values are herein utilized. The training data for the ANN includes both data generated by mathematical model and by experiment.

The invention will be better understood from the following detailed description in conjunction with the drawing, in which

FIGS. 5a–5j shows graphical interface views applicable in conjunction with the invention.

During the operation of the steam turbine, heating due to windage must be maintained within allowable limits by the operating mode. The windage modules for HP and LP turbines in accordance with the present invention will provide the operator with an estimation of the blade temperature at the respective turbine stages. The interactive user interface herein disclosed displays the real-time value, a trend graph of these values, and the respective states within the Mollier diagram. Supervisory recommendation may be deduced from the estimation and other available measurement values.

In the following, examples of the windage phenomenon are given. In the HP turbine, as there is no steam flow through the turbine following a trip, the extent of energy transfer depends on the pressure and the steam density in the turbine. At a full load trip, the corresponding high cold reheater pressure will initially be present. In order to avoid impermissible heating by windage losses, an adequate pressure decay or a certain cooling steam flow is required. The expansion lines in the Mollier diagram indicate the advantage of a sufficient HP turbine flow after full load rejection to zero load. The operator is much better informed by such a figure.

On-line visualization of the expansion/compression lines is especially beneficial for other parts of the turbine which are subject to overheating, due, in the present particular case, to the windage phenomenon. For heating steam turbines when the control valves, for example, in the cross over line for the two lower heaters are closed, the LP turbine requires cooling steam to hold within permissible limits the temperature rise caused by windage in the last stage. In this operating mode, the steam in the LP turbine absorbs energy resulting from the windage losses which predominate significantly within the last stages.

In general the windage module will follow the system architecture used in a system known as the DIGEST system. DIGEST is a modular monitoring system for power system plant developed by the KWU-FTP activity of Siemens Aktiengesellschaft, (Simens AG), a corporation of Germany. DIGEST features a modular system architecture which can be divided into six different levels which will be explain briefly below. The module components are written in C, with much flexibility in building any structure of choice.

Figure 1:
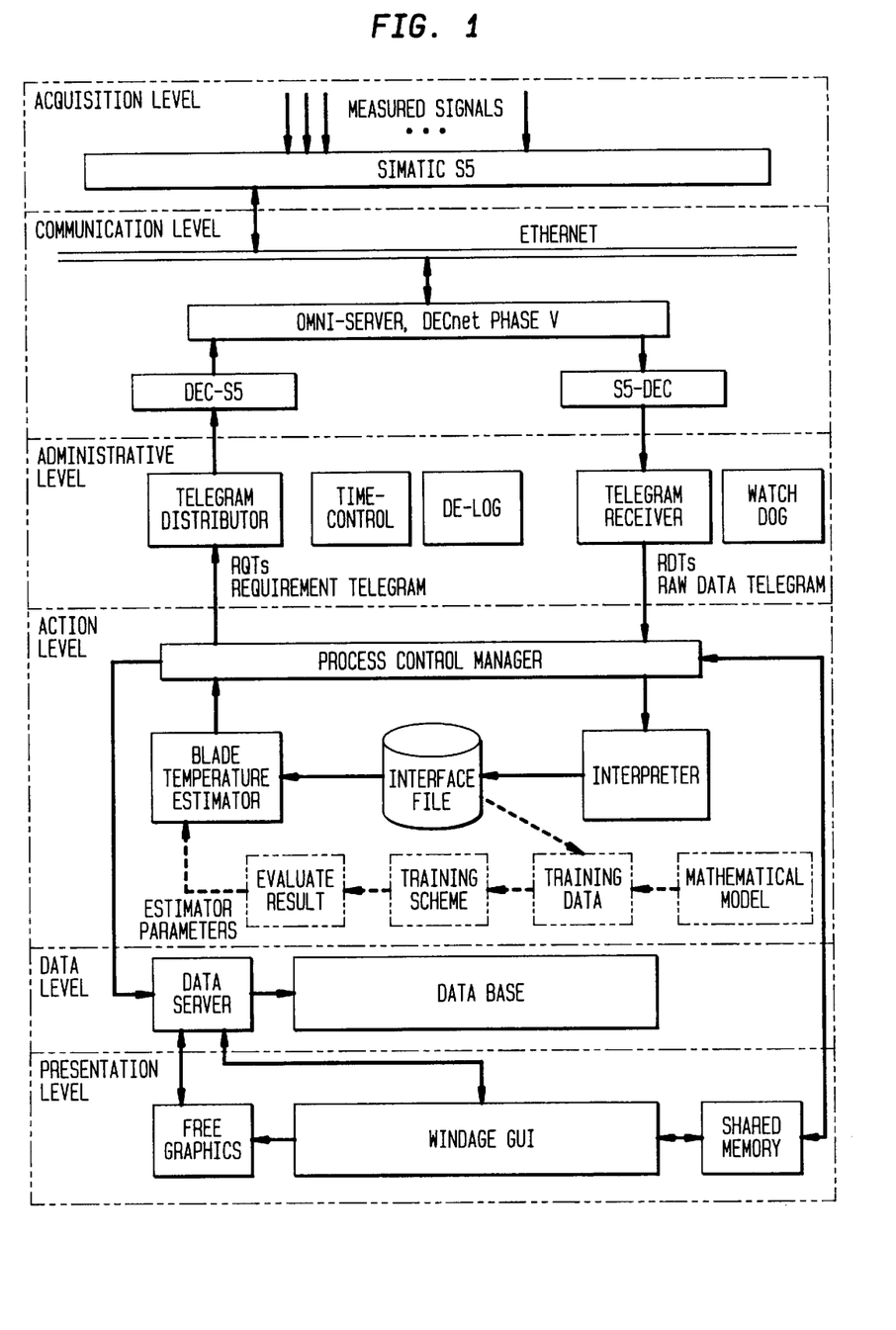
FIG. 1 shows a windage module architecture in accordance wit he invention.

The proposed windage module system architecture is shown in FIG. 1. The first two levels are already available as part of DIGEST. Modifications were done to the administrative and data levels. Modifications in both the communication and data levels include parameter specification which is needed for requesting the module-specific data through the data bus, and for creating the data server and data base. The main windage module development is done mainly at the action and presentation levels.

As indicated in FIG. 1, the six levels in the windage module are:

1. Acquisition level. This level manages the data acquisition process, which comoprises several programmable logic controllers (PLC) 2 of the type Siemens Simatic 5. Documentation on Simatic 5 is available from Siemens Industrial Automation. Its capabilities include signal sampling, A/D conversion, limited computation, executing sequence process action, cycle timing, and open communication functions. It is used in this context as a data acquisition device where it samples the measurement data at a predetermined rate, digitizes it and transfers the data through the ethernet network asynchronously.

2. Communication level. This level basically is the communication server 6 which manages the transfer of information between the network and the DEC (Digital Equipment Corporation) digital workstation machine (s). The standard DEC module that handles the communication issue is called Omni-Server/DECnet PhaseV. The processes within the DEC which manage the the data transfer are indicated by DEC-S5, 8, and S5-DEC, 10. DEC-S5 manages the data transfer from the adminstrative level to the S5, and S5-DEC manages data transfer from the S5 to the adminstrative level.

3. Adimistration level. An administration level of control handles the data request from the windage process control by propagating the request in the right format to a communication level, which is done by a telegram distributor module 12. It also manages the incoming data in a certain format and forwards the data back to the process control for storage. This is done by a telegram receiver module 14. Other functions include managing the buffer capacity (de-log), 16, self checking process (watch-dog), 18, and several timers/clocks for interrupt purposes (time-control), 20. Self checking process is mainly to check the status of all processes within the system, and re-boot the system if necessary.

4. Action level. The action level controls the continuous background process and computation. These include the initiation of data request (sending RQTs), management of incoming data (RDTs), data storage, all computation processes, and storage of results. A more detail description of this level can be found in the next section. This level may also include the output management which test the validity of the computation result. In this scheme the results of the hybrid artificial neural network (ANN) estimator are always compared to the result of the analytical module. This verification is required to detect possible bad results which are usually caused by input values which are far away from all samples that had been presented during the ANN training period. Large discrepancies may indicate that further retraining is in order.

5. Data level. The data level handles all processes concerning data storage and access. It includes the data server 22 and data base 24. All access to the data base must be done through the data server 22. Once the data is stored in the right format into the database 24, it can be accessed easily by all levels.

6. Presentation level. The presentation level provides a graphical user interface which allow the users to view all the necessary information in several different fashions, that is, current values, trend diagram and Mollier diagram. It consist of the Windage Graphical User Inteface 26, Free Graphics 28, and shared memory 30 for storing the intermediate parameter values needed for the user interface. The free graphics is an independent graphical tool for plotting any parameter values stored in the data base. This tool is developed as a part of the original DIGEST system.

The information is presented in several layers starting with the main windage screen which will mainly show the blade temperatures. The subsequent layers will show the detail conditions for each turbine section. These layers will provide information on all parameter values which are relevant to the operator for making appropriate decisions concerning the turbine operation. Further detail on the process within this level is provided in the following sections. detail in the next section. A development screen is optionally provided for accessing some internal module and system parameters or processes; however, principally because of security reasons, this feature may preferrably be omitted in an actual working version.

The monitoring process may not always be necessary to cycle at the same rate at all times; it should depend on the turbine operating conditions. Several scenarios can be predetermined for each specific turbine. For example, no load, full load, and low load during slow shutdown, start-up, and load rejection. The monitoring cycle should be adjusted automatically for different conditions, depending on their criticalities, and the respective display may be arranged to pop-up to assist the operator.

The windage module basically has two main processes, the background process and the interactive display process. The background process is responsible for obtaining the necessary parameter values, calculating the blade temperature at a predefine rate, and recording the relevant information into the appropriate shared memory and data base. The interactive display process will show the necessary or requested information graphically at any point of time. The process rate is limited by the minimum amount of time required before all measurements stabilize, and will vary based on the severity of the turbine condition. Operation near the critical blade temperature may require faster process rate.

Before the monitoring process, the ANN must be trained. The training sub-structure is responsible for producing the appropriate weights and parameters that will be used in the monitoring module. This process is done off-line and is not controllable through the GUI interface. The network is trained using the simulated data obtained by computing the estimated temperature using the analytical means for the expected normal operating domain, and actual data obtain from field experiments. The experiments concentrate on generating data in specific low steam flow conditions, such as shutdowns, loss of loads, and start-ups. This arrangement is expected to be able to estimate the blade temperature for the entire turbine operating ranges. Minimal inputs to the estimator are the real-time measurement values of the pressure of the main steam, temperature of the main steam, pressure of the third stage and exhaust pressure. Additional inputs can be optionally provided and evaluated.

The background process will obtain measurement data, calculate the blade temperature and other necessary values, and store those values in appropriate locations. The process sequences are as follows:

Request the necessary measurement data to Acquisition Level through the Communication (using DEC-S5 protocol) and Administrative Levels (telegram distributor).

Receive measurement data from data acquisition system Simatic 5 (Siemens PLC). The request is propagated through the ethernet network, communicated using the S5-DEC protocol, and managed by the tele-capture within the admistrative level.

The list of the measurement parameters include:
Pms=Pressure of main steam (bar),
Tms=Temperature of main steam (°C.),
P1=Steam pressure before blading (bar),
T1=Steam temperature before blading (°C.),
P3=Pressure at the third stage,
Pex=Exhaust pressure after reheater (bar)
Peh=Exhaust pressure before reheater (bar),
Teh=Exhaust temperature before reheater (°C.),
Tcb=Bottom casing temperature (°C.),
Tcu=Upper casing temperature (°C.),
Tci=Inside casing temperature (°C.),
Tco=Outside casing temperature (°C.),
N=Rotational speed (RPM)
Pout=Output power (NW).

Preprocess incoming data into the desired format (interpreter). This process basically reads the incoming data string and reformat it to a standard ASCII format. Store data in the intermediate files for futher processing.

Figure 2A:
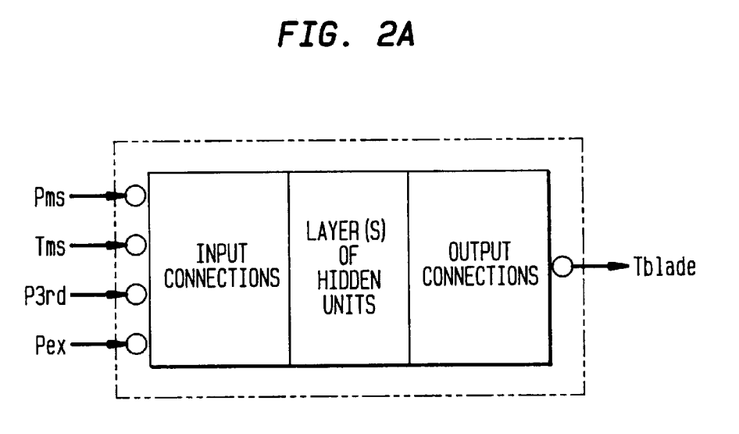
FIGS. 2a–2b show an artificial neural network based schemes for blade temperature estimation in accordance with the invention.
Figure 2B:
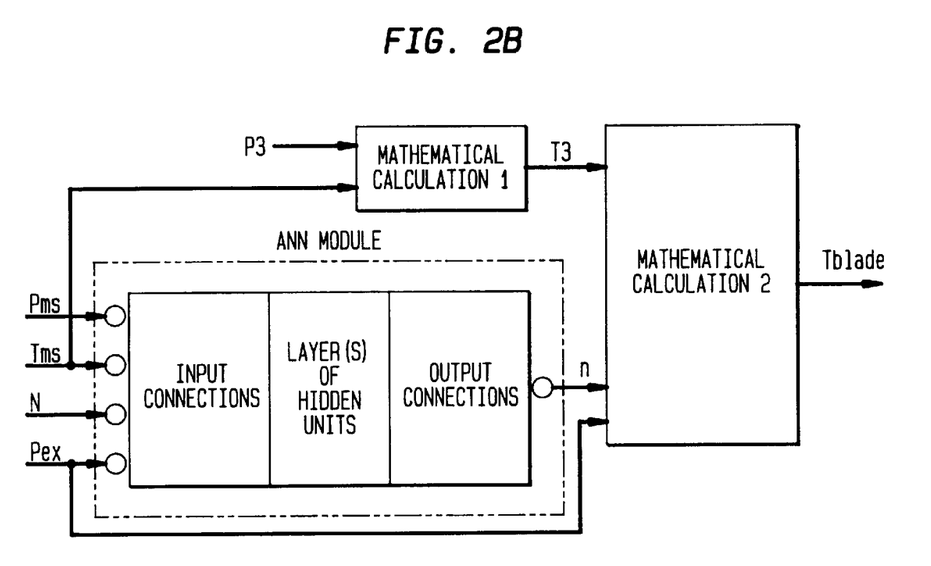

The estimator will calculate the blade temperature value using the measurement values. The input measurment values used for estimating the blade temperature, at least for the HP turbine, are:
1. Pressure of the main steam (Pms),
2. Temperture of the main steam (Tms),
3. Pressure at the third stage (P3rd), and
4. Exhaust pressure (Pex).
5. Rotational speed One approach directly estimates the blade temperature using a straightforward 3 layer ANN, FIG. 2 (a). The second approach uses a hybrid technique, FIG. 2(b) by decomposition of the intermediate parameters, where:

a. One intermediate parameter (T3) is calculated analytically using $$T_3 = \frac{T_{ms}}{\left(\frac{P_{ms}}{P_3}\right)^{\frac{n_0-1}{n_0}}} \qquad \text{Eqn. 1}$$

where $n_0$ is a given constant related to a specific turbine size.

b. Another intermediate constant (n) will be calculated by the trained ANN based on the current input values.

c. Using the two intermediate values, the current blade temperature is then calculated using the equation Equation 2 below.

$$T_{blade} = \frac{T_3}{\ln\left(\frac{P_3}{P_{ex}}\right)^{\frac{n-1}{n}}} \qquad \text{Eqn. 2}$$

In this manner, a separation is maintained between the (mathematically) unknown model from the known model. In this manner, the complexity and nonlinearity within the "black box" ANN model is reduced. Moveover, this also helps in reducing the ANN model dependence on specific turbine parameters. This improves the accuracy and robustness of the overall estimation scheme, including generalization between different turbines. This allows the method to retain flexibility such as in the alteration of intermediate parameters in the light of new knowledge, which also applies to input parameters. Such adaptability is herein contemplated.

The blade temperature estimation and other measurement parameters are then stored in two different places: the Data Base and intermediate Shared Memory.

a. All values are stored in the Data Base through the Data Server b. Values needed for display within the GUI are also stored in a temporary Shared Memory.

These values are then available for reading by the GUI process.

Figure 3:
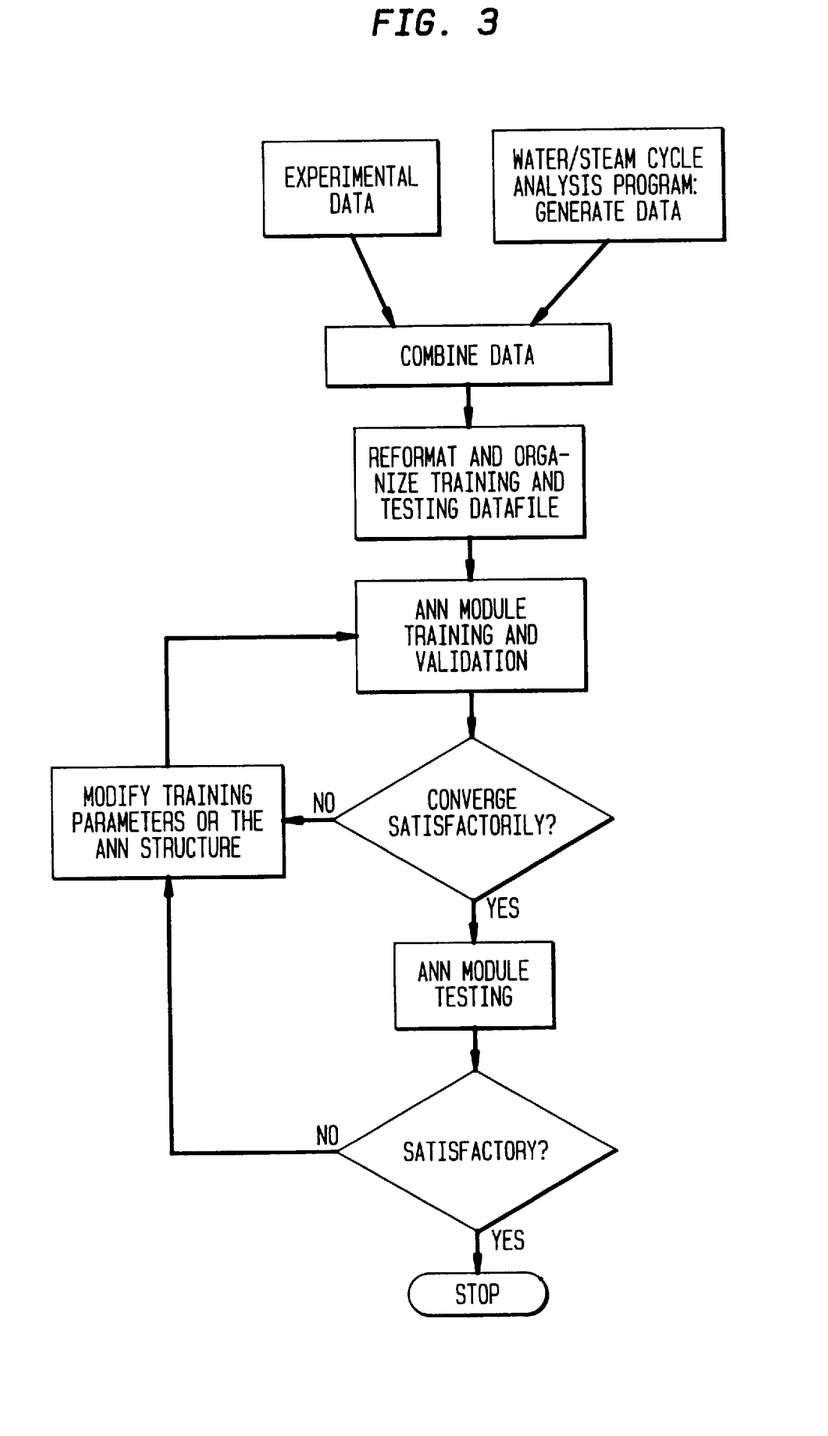
FIG. 3 shows a training procedure for an artificial neural network in accordance with the invention.
Figure 4A:
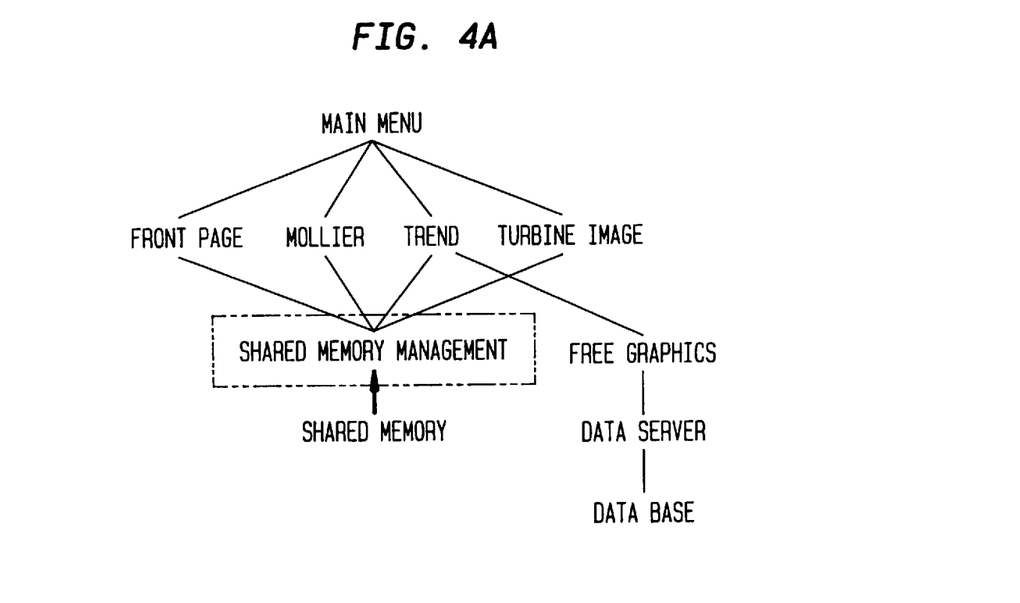
FIGS. 4a, 4b, 4c and 4d show graphical user interface structures applicable in conjunction with the invention.
Figure 4B:
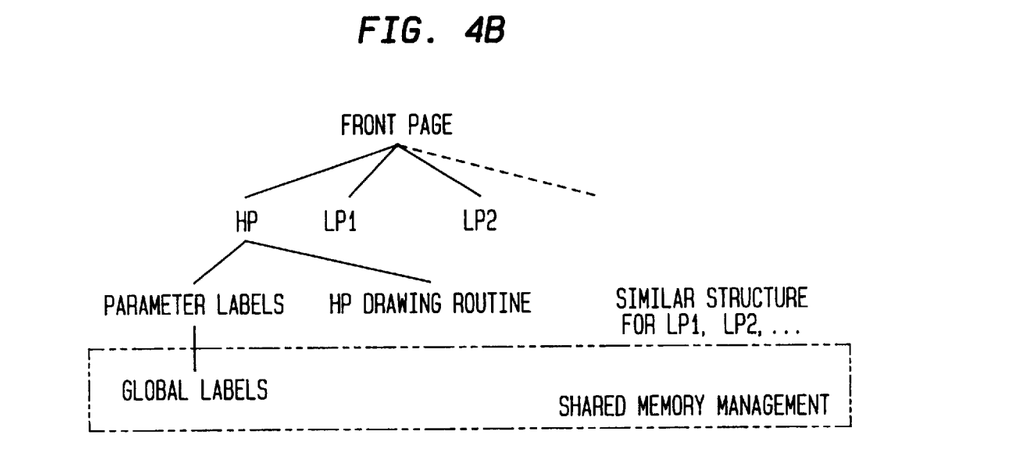
Figure 4C:
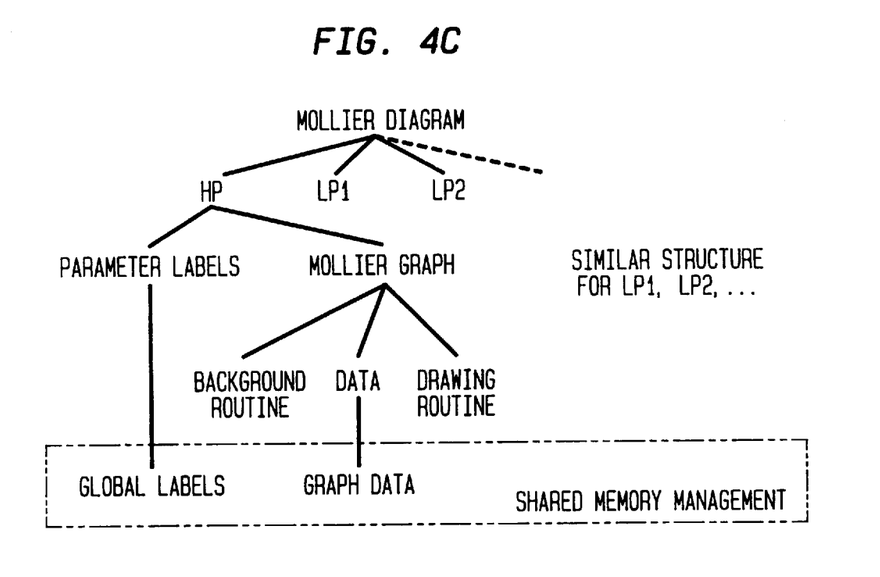
Figure 4D:
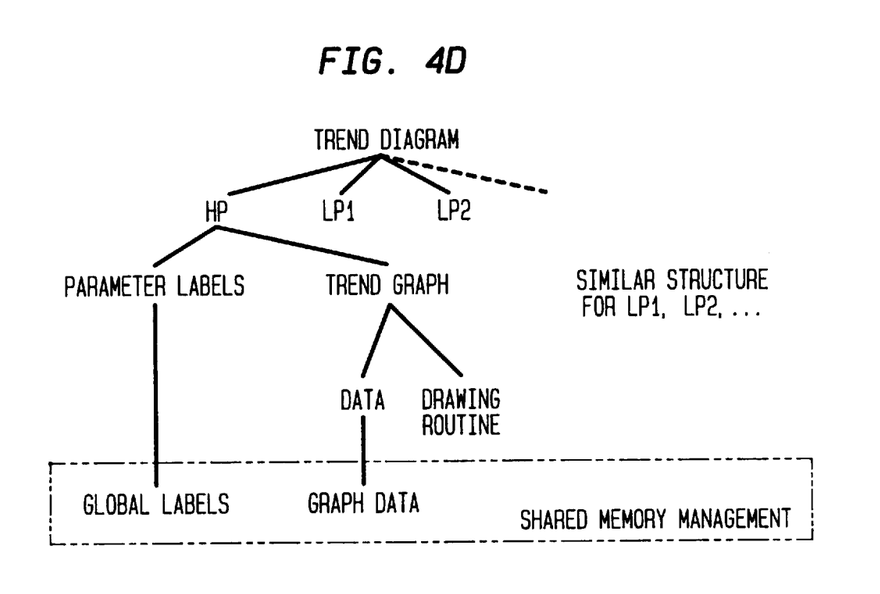

FIG. 3 shows the general traning process which applicable to the ANN-module either in the direct approach or the hybrid approach. The only difference is in the input-parameters as indicated in the background process. The process can be described as follows:

The first step is data construction which basically combines the data obtained from simulation using water/steam cycle analysis and data obtained from the experiments. Such analysis is for example included in thermodynamics modules within the DIGEST system. The water/steam cycle analysis is used inside the themodynamic module in the DIGEST system. As has been explained, the DIGEST monitoring system is currently available in the market through SIEMENS AG.

Next, the data is re- formatted such it matches the input format of the ANN. The data is then reorganized by separating the data into two separate data files where one is used for training and validation purposes, and one for testing purposes. Although there is no certain rule for regrouping the available data, data should be reorganized such that all operating regions should be well represented. In accordance with the present exemplary embodiment, 80% of the available data is utilized for training and validation and the rest for testing.

The ANN structure is a standard multilayer, with 1 hidden layer. The number of hidden units may vary from 4 to 10 without significant improvement in performance: a longer traning period is needed for larger number of hidden units, and it may run the risk of overfitting.

In reference to FIG. 3, starting with an initial set of traning parameters, including type of optimization algorithm, type of activation function, number of hidden units, error thresholds, the training process is started. The optimization algorithm used is a standard technique available in various optimization or Neural Network textbooks. See, for example, Hertz, A. Krogh, and R. G. Palmer, "Introduction to the theory of neural computation", A lecture notes volume in the Santa Fe Institute Studies in The Sciences of Complexity, Addison-Wesley Publishing Company, July 1991; and D. Rumelhart, J. L. McClelland, and the PDP Reseach Group, "Parallel distributed processing: Exploration in the mocrostructure of cognition, Volume 1: Foundations", MIT Press, Cambridge 1987.

Several techniques were investigated in conjunction with the present exemplary embodiment, including gradient descent, and few conjugate gradient techniques. Faster convergence is obtained by applying the one variation of conjugate gradient techniques.

If the system satisfactorily converges such that the validation error thresholds are satisfied then the ANN parameters (connection weights and unit's threshold values) are stored for testing. If the system does not converge, then the training parameters must be modified until a solution is obtained.

The processes above may be done repeatedly since it is generally known that the system may converge to different solution with different initial condition and training parameters. Obtaining siginificant number of solution may increase the possibility finding the global optimal solution The solutions are then tested using the data test file. The solution with the smallest error will be used in the estimation process during the background processl.

In addition to the current values and trend diagrams, the graphical user interface will also able to show the turbine conditions within the steam behavior Mollier diagram. This diagram, also called a Mollier chart, entropy/enthalpy diagram, or a total heat/entropy diagram, serves as a familier environment for any thermodynamics engineer and a better representation of the turbine condition with respect to all known critical operating boundaries. Therefore, this on-line turbine condition visualization will better help a user in taking appropriate control actions.

Generally the GUI process must be initiated by the user. It will access values stored by the background process as required. The GUI process follows the following steps (see the correponding illustration in FIG. 4).

The Windage Graphical User Interface Module can be initiated independently or from within DIGEST. This will automatically initiate the connection to the Shared Memory unit. The shared memory unit is basically a routine which manages the access and transfer of data between the GUI and any process outside it which mainly includes a buffer.

From the front page, FIG. 5 (a), the user can select, through the 'TURBINE' menu, so as to view any of the following turbine windows:
HP turbine,
LP1 turbine,
LP2 turbine,
or any other turbines (of applicable).

Figure 5A:
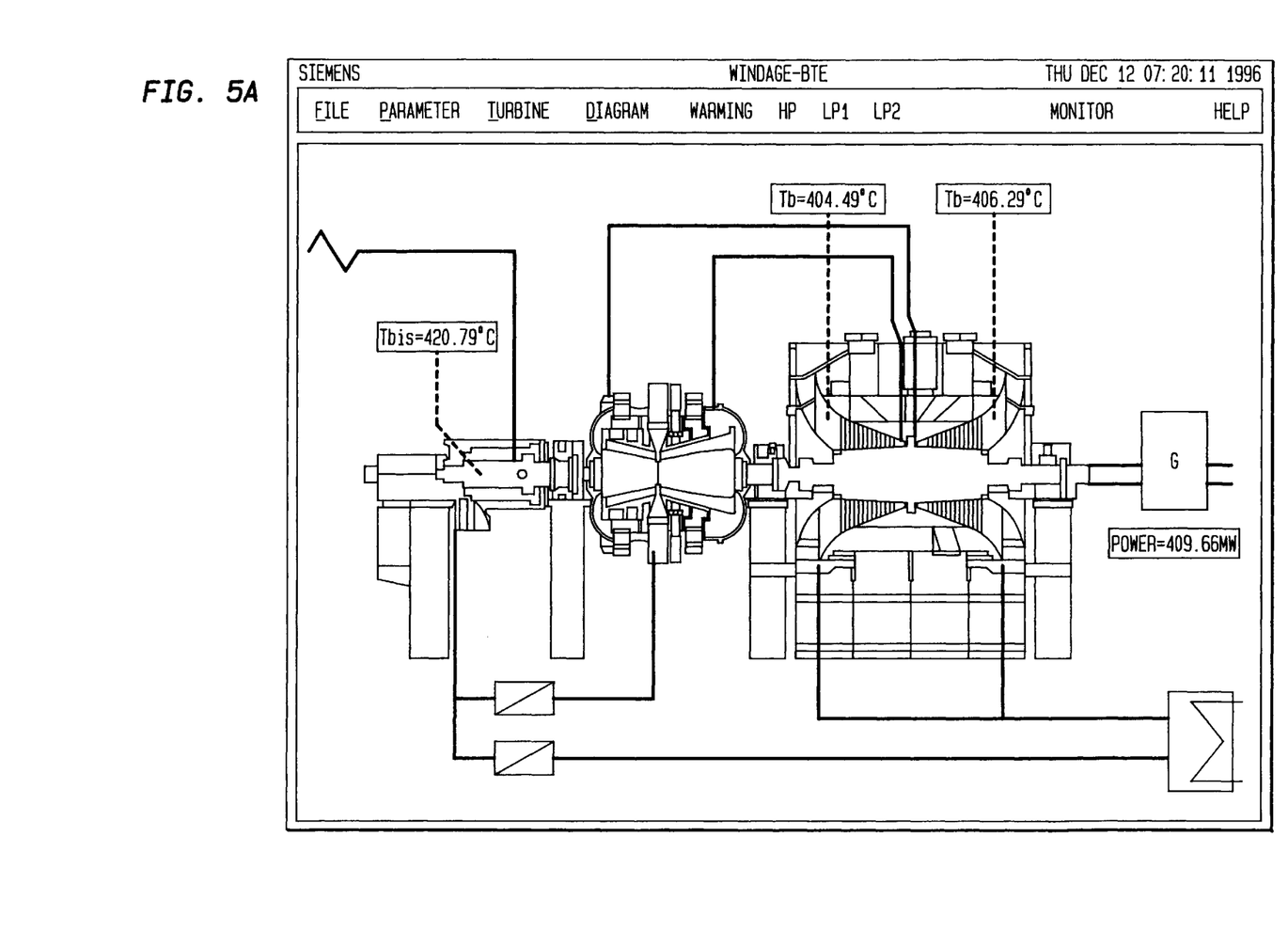
Figure 5B:
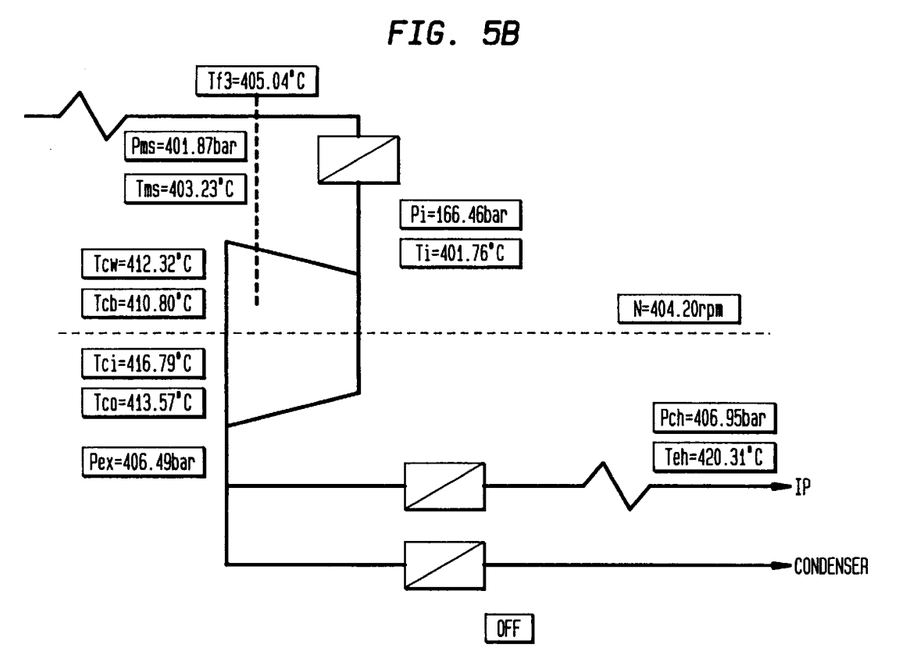
Figure 5C:
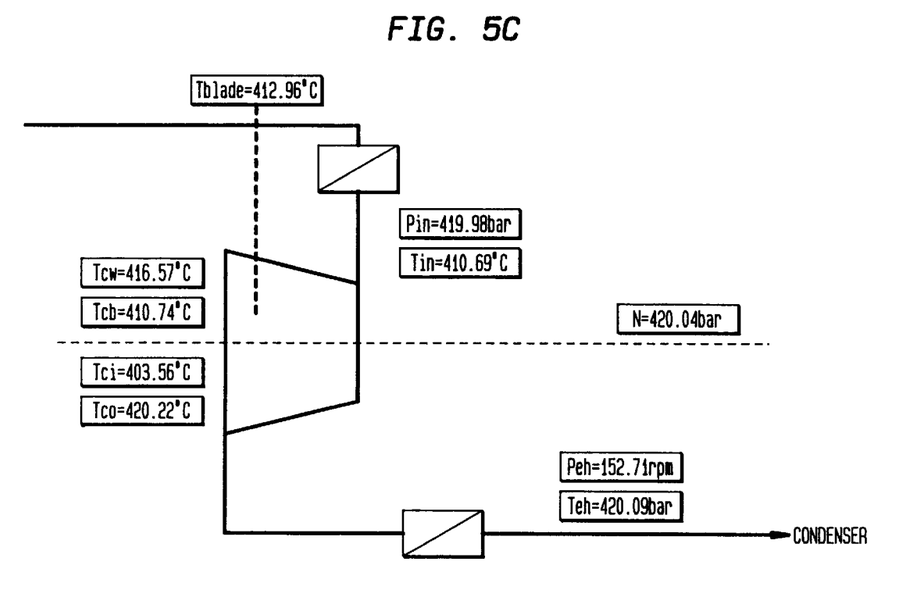
Figure 5D:
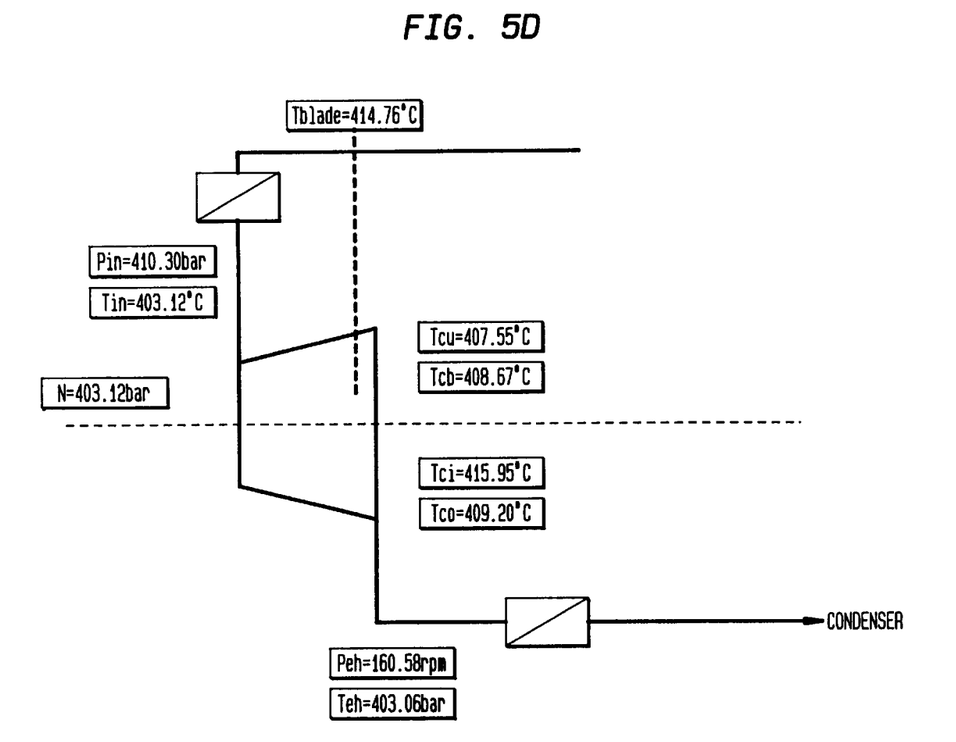
Figure 5E:
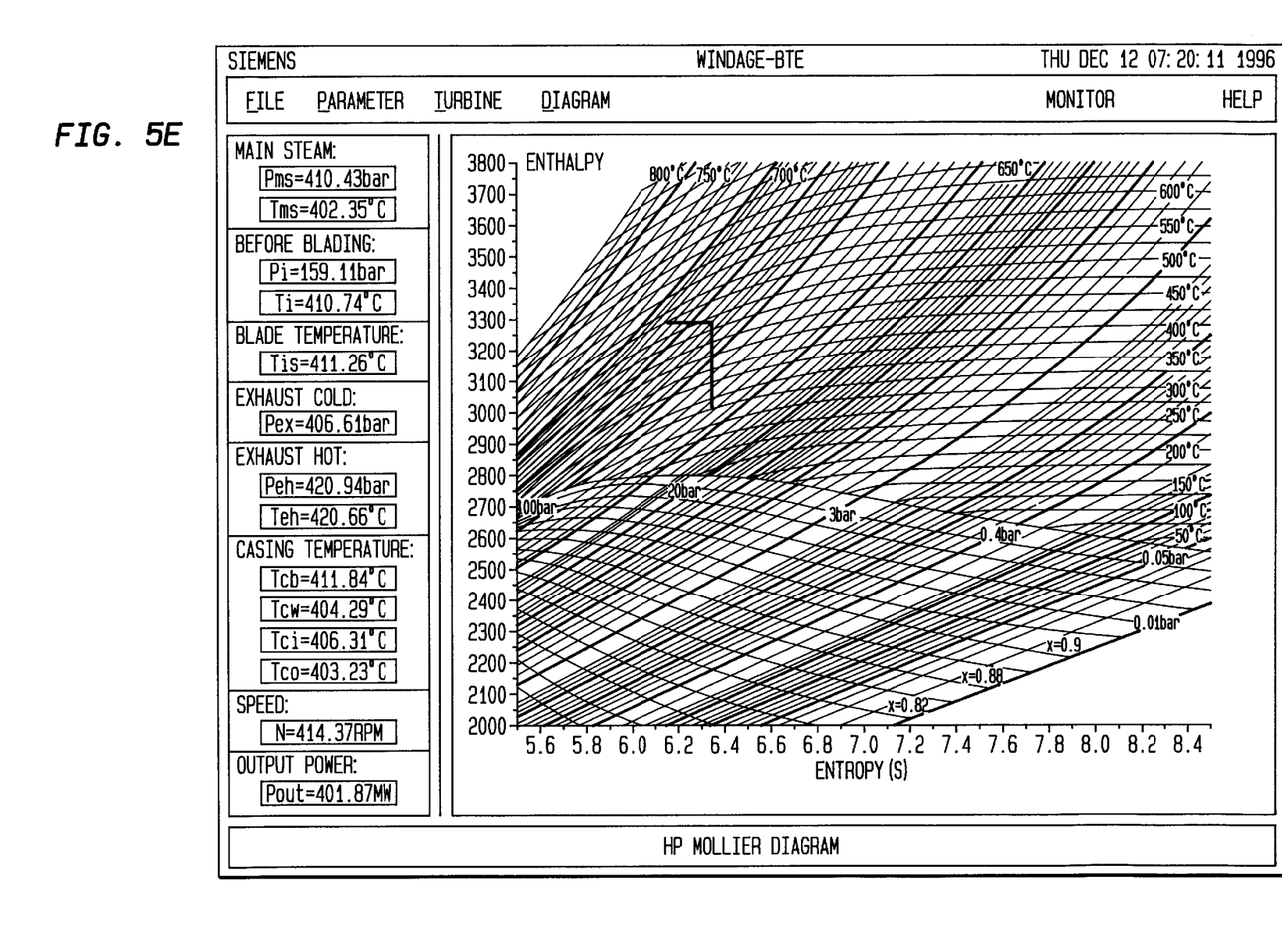
Figure 5F:
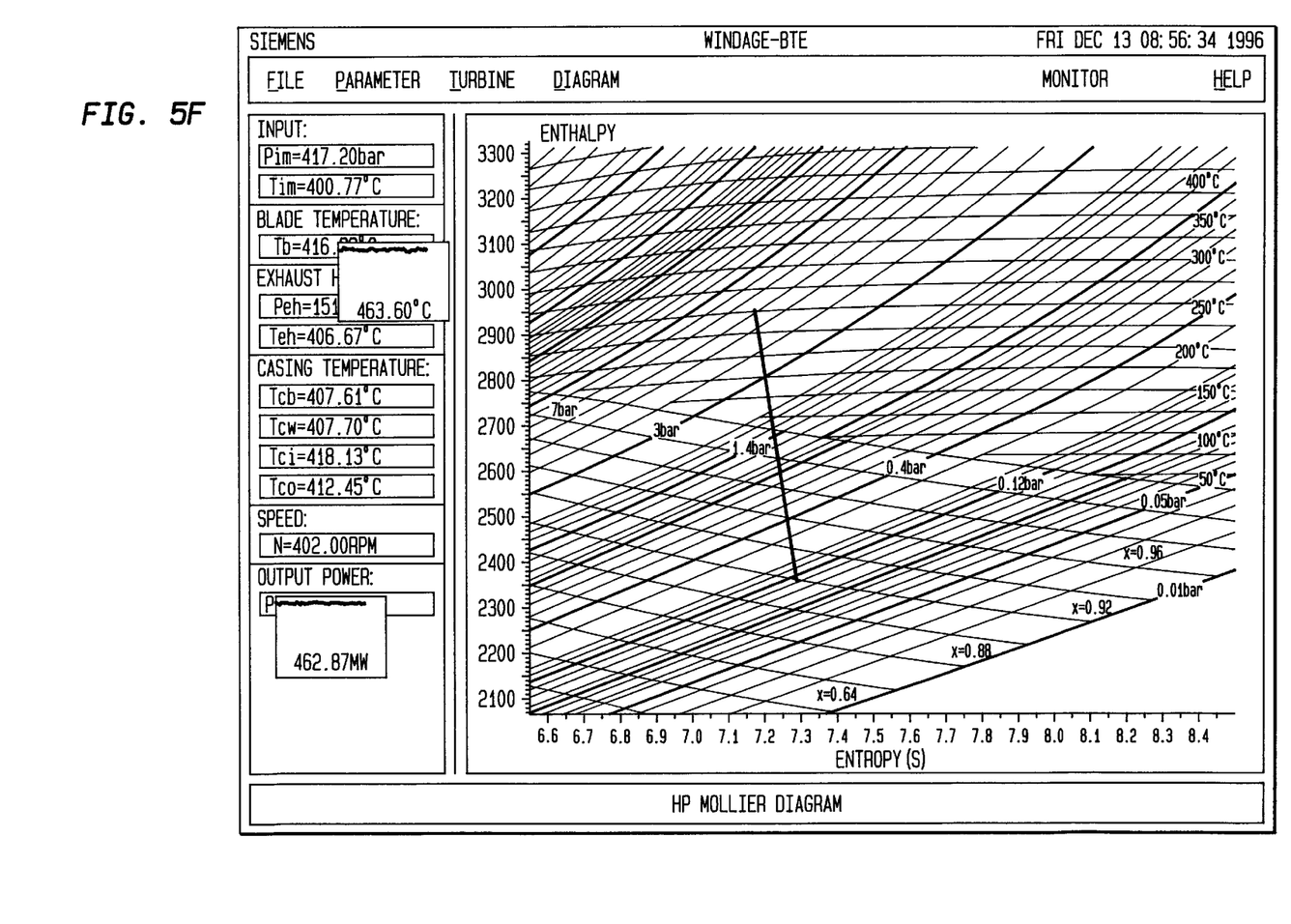
Figure 5G:
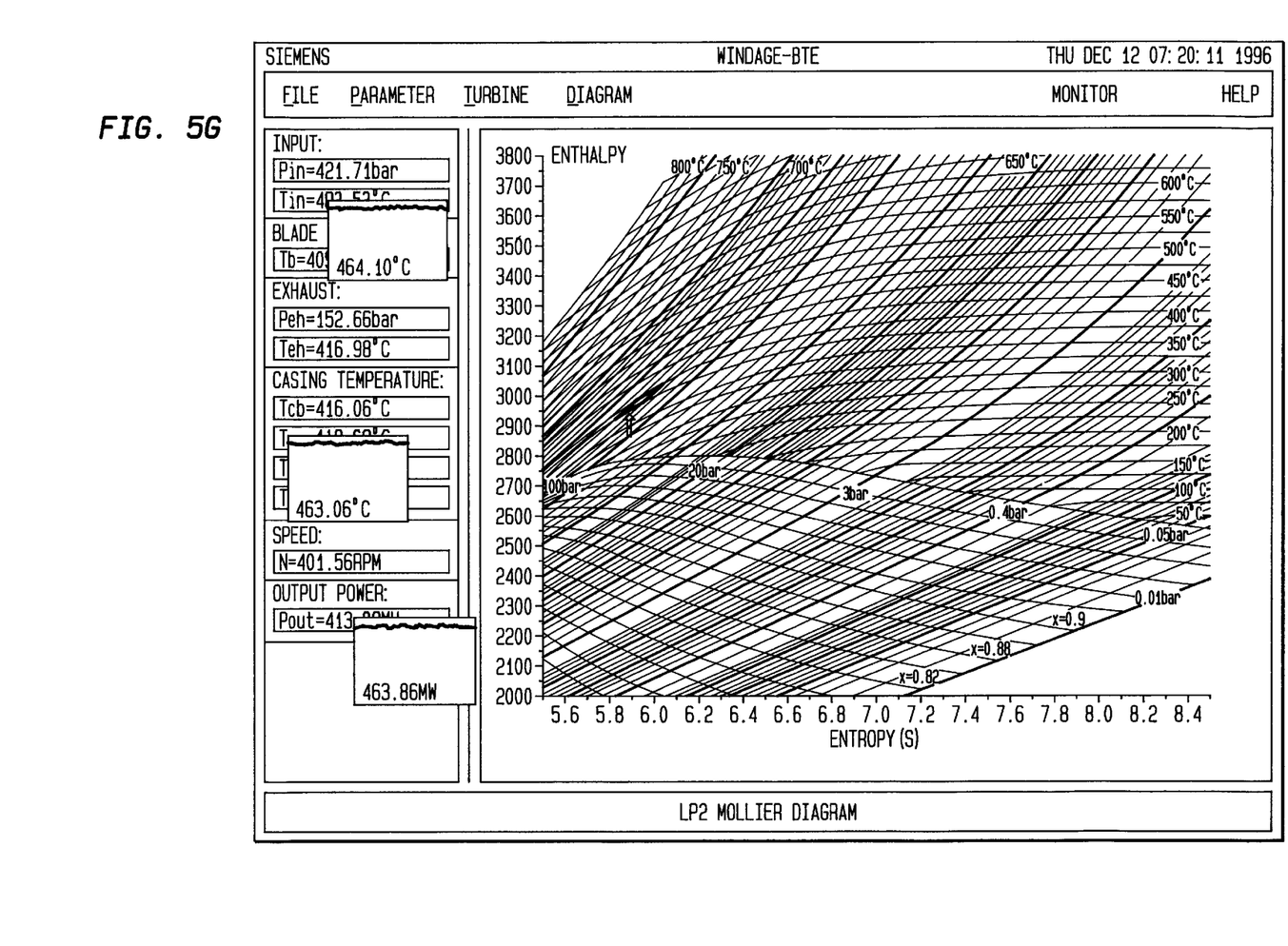
Figure 5H:
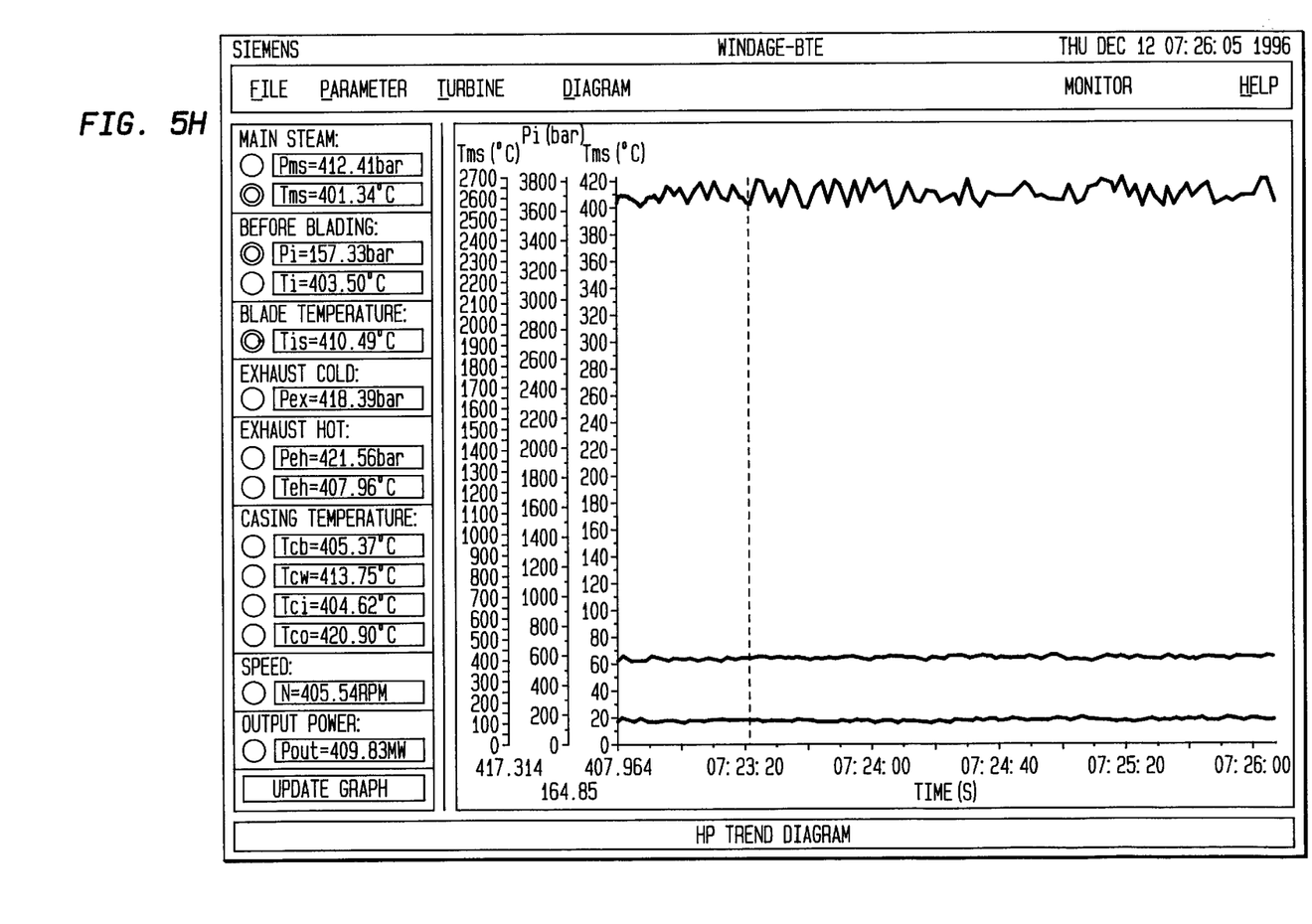
Figure 5I:
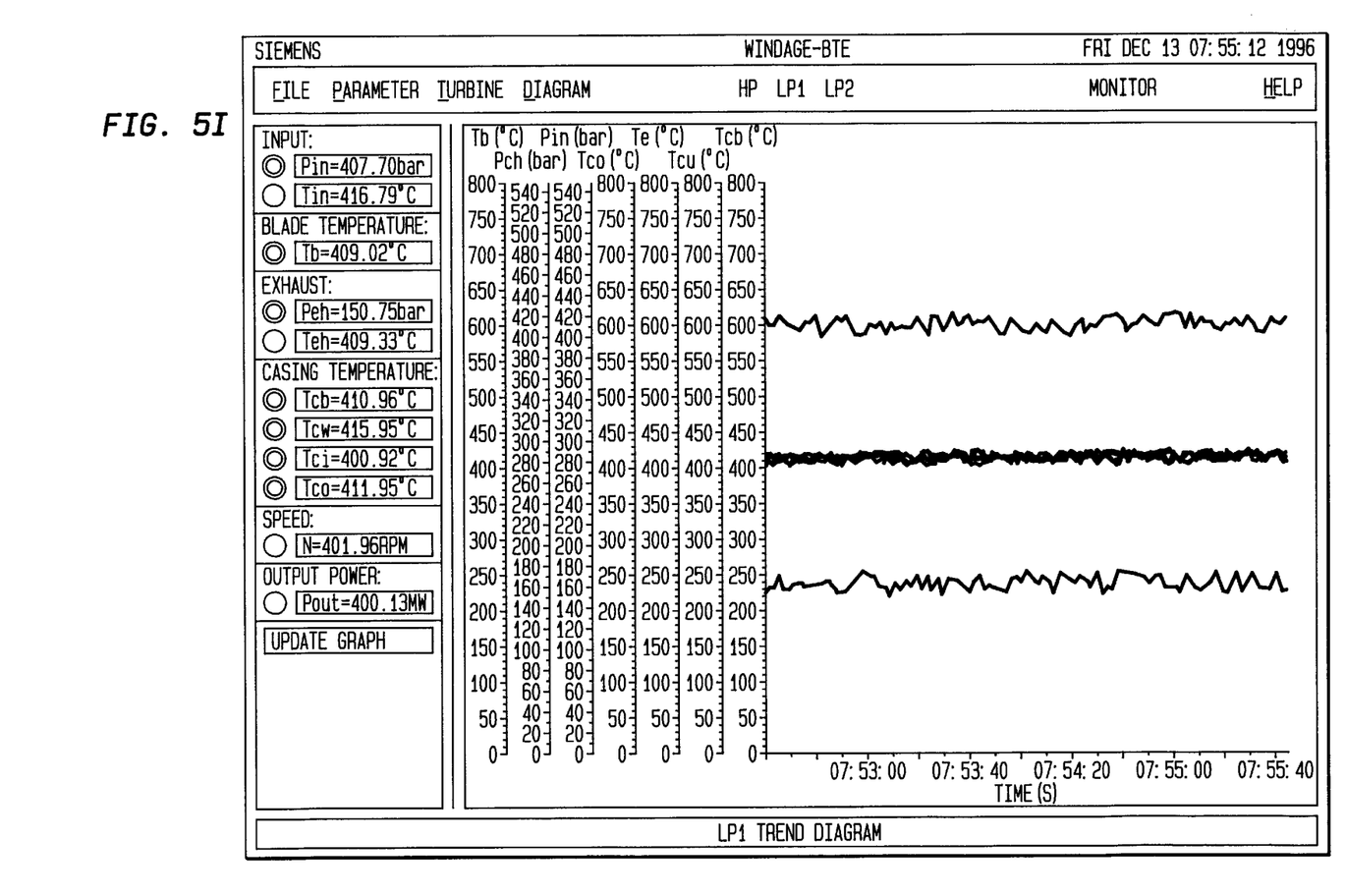
Figure 5J:
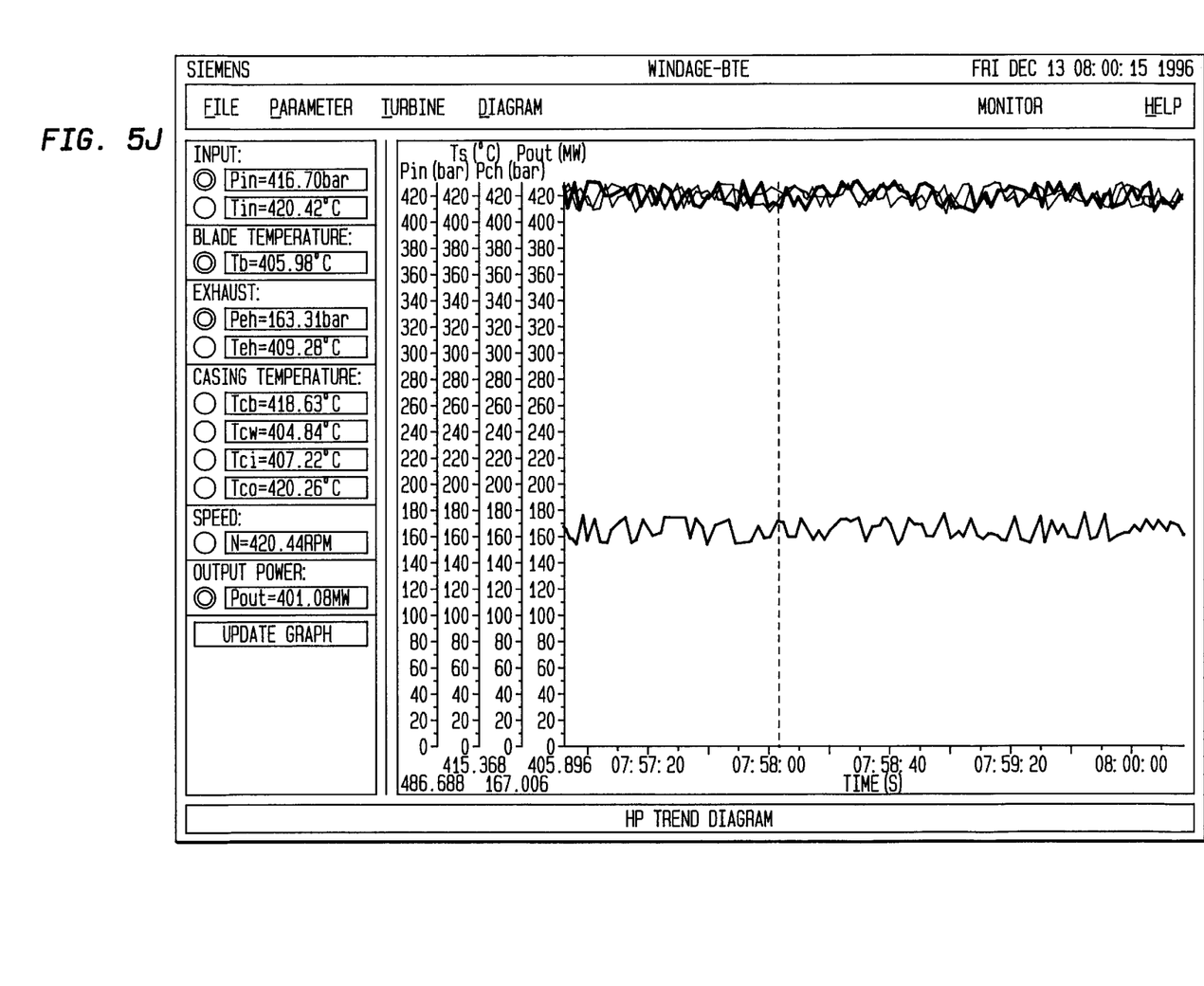

For each turbine, there are three view windows that can be selected through the 'DIAGRAM' menu:
turbine overview (FIGS. 5(b)–5(d),
mollier diagram (FIGS. 5(e)–5(g), or
trend diagram window(FIGS. 5(h)–5(j).

The 'turbine overview window' gives the current value of the blade temperature, as well as other information which may be important for the user to make any decision concerning the control of the turbine.

The Mollier diagram is generated based on the standard thermodynamic calculation available on any thermodynamic text book such as the afore-mentioned books. A routine is herein used which will generate the background Mollier grid, and then overlay the expansion data which are calculated from the current measurement values on top of the grid. For example, such a routine is available from Siemens AG in VISUM, a user manual, Version 3, October 1992.

Several features which built into the Mollier diagram window include:

1. Capability to zoom within the enthalpy-entropy graph just by creating a box with the mouse enclosing the desired region.
2. Instant mini trend diagram, which can be activated by clicking at the correponding parameter value table/box.
3. Mollier option interface, provide ways to personalize the viewing parameters to the user preferences. It also provide temperature thresholding which allow the user to set a certain threshold for activating the warning label and sending an alarm signal to the operator.

The trend diagram allows the selection of up to ten parameters to be shown at the same time. The maximum number of parameters that can be shown is essentially unlimited; however, any number larger than ten will cause difficulties in viewing the graph itself. It has the same feature as feature #2 in the Mollier diagram. The exact value within a graph can be found by clicking on the desired point. The exact value will be displayed under the corresponding axis.

From the trend diagram window, the user can further analyze the data by selecting the 'FREE GRAPHICS' which will give the user access to the complete data base. This component is provided within the DIGEST system.

The GUI display process will access the necessary data from the Shared Memory, with the exception of the FREE GRAPHICS routines which will access data from the data base through the data server.

While the invention has been described by way of exemplary embodiments, various changes and modifications will suggest themselves to one skilled in the art who becomes familiar with the invention. For example, the choice of parameters made herein can be changed as a matter of choice or convenience. These, and like changes are contemplated to be within the scope and spirit of the invention which is defined by the claims following.

What is claimed is:

1. A method for blade temperature estimation in a steam turbine utilizes measurement parameter values including pressure and temperature at locations at least one of the input and output stages, comprising the steps of:

simulating blade temperature values by using a water/steam cycle analysis program and by directed experiments;

training an artificial neural network (ANN) by presenting it with said measurement values and said blade temperature values; and applying real time measurement values to said ANN.

2. A method for blade temperature estimation in accordance with claim 1, wherein said measurement values are four in number.

3. A method for blade temperature estimation in accordance with claim 1 wherein said ANN is used directly to derive operating blade temperature values.

4. A method for blade temperature estimation in accordance with claim including the steps of:

creating a first subset of said parameter values;

utilizing said first subset for training said ANN;

creating a second subset of said parameter values;

utilizing said second subset for performing a calculation for deriving an intermediate parameter; and utilizing said intermediate parameter and one of said measured parameter values to calculate a blade temperature value.

5. A method for blade temperature estimation in accordance with claim 4, wherein 5 measured parameter values are utilized and said first ubset comprises 4 measured parameters.

* * * * *